(12) United States Patent
Khudyakov et al.

(10) Patent No.: US 7,022,382 B1
(45) Date of Patent: Apr. 4, 2006

(54) UV-CURE OF COATINGS FOR AN OPTICAL FIBER WITH A LASER

(75) Inventors: Igor Vladimir Khudyakov, Hickory, NC (US); Michael P. Purvis, Hickory, NC (US); Bob J. Overton, Lenior, NC (US)

(73) Assignee: Alcatel, Paris (FR)

( * ) Notice: Subject to any disclaimer, the term of this patent is extended or adjusted under 35 U.S.C. 154(b) by 99 days.

(21) Appl. No.: 10/030,451

(22) PCT Filed: Jun. 16, 2000

(86) PCT No.: PCT/US00/11879

§ 371 (c)(1),
(2), (4) Date: May 21, 2002

(87) PCT Pub. No.: WO01/98223

PCT Pub. Date: Dec. 27, 2001

(51) Int. Cl.
*G02B 1/10* (2006.01)
*G02B 6/16* (2006.01)
*B05D 3/06* (2006.01)

(52) U.S. Cl. .............. 427/513; 427/492; 427/508; 427/554; 427/163.1; 427/163.2; 427/444; 118/620; 65/392; 250/503.1; 250/504 R

(58) Field of Classification Search .......... 427/487, 427/492, 508, 513, 554, 596, 163.1, 163.2, 427/444; 118/50.1, 68, 420, 620, 641; 65/392, 65/432; 250/493.1, 492.1, 503.1, 504 R
See application file for complete search history.

(56) References Cited

U.S. PATENT DOCUMENTS

| | | | | |
|---|---|---|---|---|
| 3,407,294 | A | * 10/1968 | Hill | 362/259 |
| 3,915,824 | A | 10/1975 | McGinniss | |
| 4,069,080 | A | * 1/1978 | Osborne | 156/272.8 |
| 4,227,907 | A | 10/1980 | Merritt | |
| 4,448,657 | A | 5/1984 | Turro | |
| 4,566,762 | A | * 1/1986 | Kato | 359/487 |
| 4,650,322 | A | * 3/1987 | Fejer et al. | 356/73.1 |
| 4,774,104 | A | 9/1988 | Severijns et al. | |
| 4,812,150 | A | 3/1989 | Scott | |
| 4,849,640 | A | * 7/1989 | Kruishoop | 250/492.1 |
| 4,958,900 | A | * 9/1990 | Ortiz, Jr. | 385/33 |
| 5,000,772 | A | 3/1991 | Petisce | |
| 5,015,068 | A | * 5/1991 | Petisce | 385/123 |

(Continued)

FOREIGN PATENT DOCUMENTS

EP 0 202 803 A2 * 11/1986

(Continued)

OTHER PUBLICATIONS

Patent Abstracts of Japan, Publication No. 64-087536, Sumitomo Electric Ind. Ltd., Mar. 31, 1989.

(Continued)

*Primary Examiner*—Timothy Meeks
*Assistant Examiner*—Wesley D. Markham
(74) *Attorney, Agent, or Firm*—Sughrue Mion, PLLC

(57) ABSTRACT

An apparatus and method efficiently focuses laser light to a target fiber to rapidly and evenly cure a coating on the fiber and to increase a draw rate for the fiber. The laser light is expanded and refocused to a strip of light having a diameter that is a multiple of the fiber diameter. The strip of light is applied to one side of the fiber and a reflection of the strip of light is focused to a second side of the fiber to provide uniform radiation of the fiber.

22 Claims, 1 Drawing Sheet

U.S. PATENT DOCUMENTS

| | | | |
|---|---|---|---|
| 5,114,738 A | | 5/1992 | Savage et al. |
| 5,275,917 A | * | 1/1994 | Inaishi .................... 430/288.1 |
| 5,620,495 A | | 4/1997 | Aspell et al. |
| 5,761,367 A | | 6/1998 | Matsumoto |
| 5,992,181 A | | 11/1999 | Geertman |
| 5,995,697 A | | 11/1999 | Byron et al. |
| 6,033,829 A | * | 3/2000 | Yamada et al. .......... 430/281.1 |
| 6,078,713 A | * | 6/2000 | Tausch et al. ............... 385/115 |
| 6,195,486 B1 | * | 2/2001 | Field et al. ................. 385/100 |
| 6,463,872 B1 | * | 10/2002 | Thompson ................. 118/50.1 |

FOREIGN PATENT DOCUMENTS

GB     2 166 975 A     5/1986

OTHER PUBLICATIONS

Publication No. 01-087536 (JP 1087536 A), Mar. 31, 1989, Oshima Toshio (Abstract).

* cited by examiner

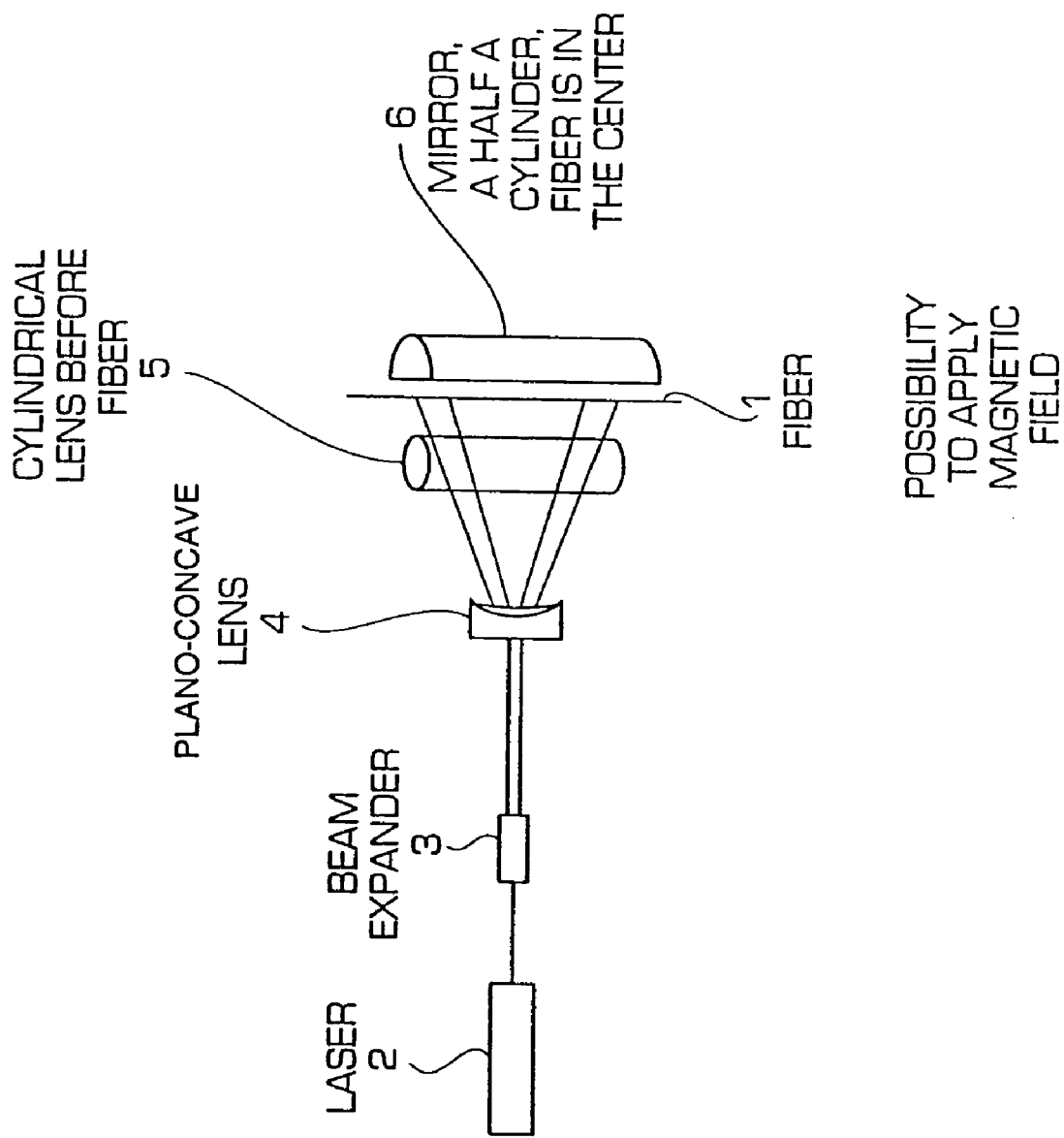

UV-CURE OF COATINGS FOR AN OPTICAL FIBER WITH A LASER

FIELD OF INVENTION

The present invention relates to an effective method to cure a protective coating on an optical fiber with a continuous wave (cw) or a pulsed laser that permits the draw rate for an optical fiber to be increased. In particular, the method relates to aligning a laser beam on a drawn optical fiber for even irradiation and cure of a coating disposed on the fiber.

DESCRIPTION OF RELATED ART

In the manufacture of an optical fiber, a glass preform rod is moved in a furnace at a controlled rate. The furnace softens the preform so that the optical fiber can be drawn from the molten end of the preform rod by a capstan.

Because the drawn optical fiber is susceptible to damage, a coating must be applied to the optical fiber after it is drawn from the preform rod but before contacting another surface. To provide such a protective coating, a material is applied to the fiber, which must be solidified before the drawn fiber reaches the capstan. The solidification is aided by cure techniques. A wet-on-wet draw technique is an exemplary form of drawing optical fiber from a preform. The wet-on-wet draw technique comprises applying a first coating to the fiber and applying a second coating to the fiber while the first coating is still in its viscous form. Both the first and second coatings are subsequently cured. Other techniques are also known, such as applying a first coating, followed by cure of the first coating, then applying a second coating and cure of the second coating. This second technique requires additional equipment to be included in the draw tower, but is simpler than the wet-on-wet draw technique which requires processing of the first coating while in its viscous form. Other techniques may also be employed, and the invention is not limited to the type of technique used.

A conventional technique for cure of the coating for optical fibers includes irradiation of the coating using a microwave-powered lamp, such as a Fusion lamp. Commonly employed Fusion lamps are H-bulb, D-bulb, and V-bulb in diameters of 9, 11 or 13 mm. However, it is impossible to focus a significant quantity of the lamp light onto the narrow fiber. In practice, only one to several percent of a Fusion lamp may be focused on the fiber element to be coated. Moreover, the energy of a heat Fusion lamp cannot be sufficiently directed making it difficult with coat the fiber in an even manner. Excessive heating effects and infrared radiation introduced by the Fusion lamp also degrade the characteristics for the coating material.

The application of a magnetic field often expedites the polymerization of the fiber coating, as discussed in U.S. Pat. No. 5,000,772 (Petisce). However, the bulk of the Fusion lamp makes it difficult for such a magnetic field to be applied to the fiber. To provide a magnetic field strong enough to affect the curing rate in a Fusion lamp arrangement would require a field so strong that it would reduce the microwave discharge of the Fusion lamp. The intensity of the lamp becomes quenched, making it difficult to provide sufficient intensity to cure the coating. Therefore, the technique of increasing the cure rate using a magnetic field is not practicable or convenient with the use of a Fusion lamp.

To improve the efficiency of the curing process, a laser can be used in place of the microwave lamp. U.S. Pat. No. 4,812,150 discloses use of a laser to cure coatings by using the laser as a source of heat. However, the laser provides localized heating which will cause the fiber to bow since heating and curing on one side of the fiber will be greater than on the other. Further, excess heat may be generated due to local focusing of the laser beam, resulting in a coating with an undesirable modulus. Other known methods of applying lasers for photocuring purposes, such as U.S. Pat. No. 4,227,907 and U.S. Pat. No. 5,761,367, suffer from similar deficiencies due to lack of directivity imparted to a laser beam.

SUMMARY OF INVENTION

The present invention overcomes the above deficiencies by using a laser source to initiate a photochemical process in the coating, and by using optical devices which produce a collimated laser beam for curing purposes. With such an arrangement, it is possible to cure a fiber coating with a laser source that is displaced from the target fiber. The displacement between the source and the target fiber mitigates the heat and infrared damage to the coating during cure. The optical devices further spread the laser about the target fiber to achieve an even distribution of energy for curing purposes. An elongated beam, provided through a beam expander and plano-concave lens, permits a larger portion of the target fiber coating to be cured at one time. Since the laser source is displaced from the fiber, it becomes practical to apply a magnetic field to the target fiber having a curable coating, thereby further increasing the rate of cure by 20–40%. I. V. Khudyakov, et al., "Kinetics of Photopolymerization of Acrylates Studied with a Cure Monitor and PhotoDSC", Proceedings of SPIE, vol. 3848, 1999, p. 151–156. This further permits an increase in the draw rate for the optical fiber.

The laser beam wavelength is selected such that the laser energy is absorbed by photoinitiator(s) in the coating. In a preferred embodiment, the coating has two photoinitiators, one with an absorption maximum at approximately 300 nm and one at approximately 400 nm. The use of two photoinitiators is important for wet-on-wet draw techniques.

DESCRIPTION OF PREFERRED EMBODIMENT

BRIEF DESCRIPTION OF DRAWINGS

A preferred embodiment will be discussed in detail below with reference to the sole drawing which illustrates an arrangement for directing a collimated laser beam evenly about a target fiber.

Referring to the drawing, a target fiber 1 is drawn from a perform (not shown) and is subjected to an environment to begin the coating process. The invention may be applied to any standard curing environment, including environments for applying primary and secondary coatings. As examples, an environment including a photoinitiator of 2-hydroxy-2-methyl-1-phenylpropan-1-one or 2, 4, 6-trimethylbenzoylphosphineoxide (or a combination thereof) can be used.

The target fiber 1 is displaced from a laser 2. An exemplary distance is approximately ten feet. This displacement is further than conventional techniques using a Fusion lamp and provides a benefit by reducing the amount of damaging infrared heat irradiated to the target fiber. The laser source 2 can be selected from numerous types of continuous and pulsed lasers. An example of continuous wave lasers include a Beamlok $Ar^+$ manufactured by Spectra-Physics. This laser is operable to emit a number of wavelengths from $\lambda 333$ to 351 nm in the ultraviolet range. The $Ar^+$ laser is suitable for industrial applications, having a power output of approximately 7 W. An exemplary pulsed laser includes Nd:YAG from Spectron Laser Systems. The third harmonic of the Nd:YAG laser has a wavelength of λ355 nm, which is the most suitable for curing of a fiber coating. However, other harmonics may also be used for curing purposes. The output power is 5 W with a frequency of 10 kHz. Any high frequency UV pulsed laser is suitable. Another acceptable laser is an ultraviolet excimer XeCl laser having λ308 nm, which is manufactured by Lambda Physik.

Light with the above range of wavelengths is absorbed by most photoinitiators conventionally used for coating materials. However, some photoinitiators are able to absorb energy in the visible light range (e.g. 400 nm to 800 nm), and so a laser source emitting energy in this range may also be used. For instance, a laser diode emitting light in the visible range may also be adapted to initiate polymerization. The process can be aided with the inclusion of dyes absorbing this range of light into the fiber coating. The $Ar^+$ laser can be used for simultaneous excitation of two photoinitiators with an absorption maxima in the ultraviolet region. One photoinitiator has an absoprtion maximum closer to 300 nm, another photoinitiator has a maximum closer to 400 nm.

The use of a laser beam source also makes it possible to excite photoinitiators by monochromatic light within a more narrow wavelength (e.g. ±0.5 nm). This selectivity makes it possible to initiate and control polymerization for coating materials. By comparison, no such selectivity or control is possible with the Fusion lamp which excites indiscriminately across a broad range (on the order of 100 nm) of wavelengths. The fusion lamp may uncontrollably excite materials such as dyes or pigments included in the optical fiber coating.

Referring to the Figure, the laser is irradiated in the direction of a beam expander 3. The collimated beam of the laser is in the form of an intense spot. If this spot were used for curing purposes, its intensity could potentially damage the target fiber as in conventional systems. Therefore, the beam expander 3 is used to distribute the collimated beam having a small diameter of approximately 2 mm into a larger diameter of one to several inches. The expanded beam is further passed through a plano-concave lens 4 and a cylindrical lens 5 to focus the laser to a length of approximately 3–4 inches and having a diameter of several diameters of the target fiber. An exemplary diameter range for the striped beam is 1–3 mm. Opposite to the cylindrical lens on the other side of the fiber is a mirror 6 formed in a half-cylinder shape. The fiber is disposed in the center portion of the mirror. The mirror aids in distributing the light evenly about the target fiber.

The displacement between the laser source and the target fiber can comprise a large distance due to the collimation of the laser and the focusing provided by the optical elements. A displacement of more than 2 meters is permissible. In addition to mitigating extraneous heat effects, this displacement has the additional benefit of allowing space for a magnetic field generator (not shown) to be included in the curing arrangement. The application of the magnetic field is provided by known mechanisms and thus the details are omitted from this description.

The invention may also be implemented without the mirror 6 by disposing one or more additional laser sources about the target fiber to provide symmetrical illumination. For example, two lasers may be disposed 180 degrees apart about the target fiber or three lasers may be disposed 120 degrees apart. The inclusion of several laser sources would increase the intensity ($W/cm^2$) and also the beam exposure ($J/cm^2$). However, because laser sources are costly, the inclusion of the half-cylindrical mirror 6 helps minimize the cost of the curing apparatus.

Through use of a laser and basic optical devices, the laser energy can be focused precisely and uniformly on a drawn fiber. This permits efficient use of curing energy and an increase in the rate that a fiber is drawn. Draw rates at speeds more than 1000 m/min. may be possible with the arrangement described above.

Though a preferred embodiment has been discussed above in connection with the invention, it is possible for one skilled in the art to depart from the specific disclosure but remain within the spirit and the scope of the present invention.

What is claimed is:

1. An apparatus for photocuring a coating on a target fiber, comprising:

a laser source;

a beam expander for expanding an output of the laser source;

a first lens operable to focus an output of the beam expander on the coating disposed on the target fiber, wherein the coating is responsive to a wavelength of light emitted from the laser source; and a concave optical element disposed on an opposite side of the target fiber relative to the beam expander and said first lens, wherein the concave optical element comprises a half cylinder mirror.

2. The apparatus of claim 1, wherein said first lens comprises a plano-concave lens with a planar side disposed towards said beam expander.

3. The apparatus of claim 1, wherein said laser source outputs radiation in a visible light range.

4. The apparatus of claim 3, wherein said laser source is a continuous wave laser.

5. The apparatus of claim 3, wherein said laser source is a pulsed laser.

6. The apparatus of claim 3, wherein the laser source outputs radiation in a range of 400–800 nm.

7. The apparatus of claim 1, further comprising a magnetic field source which is operable to apply a magnetic field about said target fiber.

8. The apparatus of claim 7, wherein said laser source is a continuous wave laser emitting light in the UV range between 300 and 400 nm.

9. The apparatus of claim 1 further comprising a second lens disposed between said first lens and said concave optical element.

10. The apparatus of claim 9, wherein said second lens comprises a cylindrical lens.

11. The apparatus of claim 10, wherein said laser source is disposed at least 2 meters away from said target fiber.

12. The apparatus of claim 1, wherein said laser source is disposed at least 2 meters away from said target fiber.

13. The apparatus of claim 1, wherein the laser source outputs radiation in a UV radiation range.

14. The apparatus of claim 1, further comprising the target fiber having the coating disposed thereon.

15. A method of photocuring a coating on an optical fiber, comprising:

expanding a laser beam to produce an expanded diameter laser beam;

focusing the expanded diameter laser beam to a strip of light having a diameter that is larger than a diameter of the fiber onto a front side of the fiber to cure the fiber; and reflecting the laser beam strip of light to a rear side of the fiber, wherein reflecting the laser beam to the rear side of the fiber includes reflecting the laser beam with a half cylinder mirror.

16. The method according to claim 15, further comprising: applying a magnetic field around the fiber.

17. The method according to claim 15, wherein the laser beam continuously outputs light in a visible portion of electromagnetic spectrum.

18. The method according to claim 15, wherein the laser outputs pulses of visible light.

19. The method according to claim 15, wherein said laser beam emits in the range of 300–400 nm.

20. The method according to claim 15, wherein said laser beam emits radiation ir the range of 400–800 nm.

21. The method according to claim 15, wherein a source of said laser beam is disposed at least 2 meters away from the fiber.

22. A method of photocuring a coating on an optical fiber, comprising:

expanding a laser beam to produce an expanded diameter laser beam;

focusing the expanded diameter laser beam to a strip of light having a diameter that is larger than a diameter of the fiber onto a front side of the fiber to cure the fiber; and reflecting the laser beam strip of light to a rear side of the fiber, wherein the expanding, the focusing and the reflecting are provided by expanding, focusing and reflecting elements each aligned in a linear disposition with each other.

* * * * *